United States Statutory Invention Registration [19]

[11] Reg. Number: H994

Ohst et al. [43] Published: Nov. 5, 1991

[54] TRANSPOSED AIR CORE HOMOPOLAR GENERATOR CONDUCTORS

[75] Inventors: David W. Ohst, Livermore, Calif.; Jack T. Gunn, Vancouver; Dennis Pavlik, Pittsburgh, Pa.

[73] Assignee: The United States of America as represented by the Secretary of the Army, Washington, D.C.

[21] Appl. No.: 642,978

[22] Filed: Dec. 21, 1990

[51] Int. Cl.[5] ..... H02K 31/00

[52] U.S. Cl. ..... 310/178; 310/254; 310/261

*Primary Examiner*—Bernarr E. Gregory

*Attorney, Agent, or Firm*—Anthony T. Lane; Edward Goldberg; Michael C. Sachs

[57] ABSTRACT

Current state of the art air core homopolar generators employ large time varying magnetic fields (4 Tesla Range). These high fields are required for proper voltage, but also induce significant eddy currents. Use of novel transposed rotor conductors and a novel transposed coil winding reduces these currents to acceptable levels. Furthermore use of a segmented stator current collection system further reduces the flow of eddy currents.

7 Claims, 5 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

TRANSPOSED AIR CORE HOMOPOLAR GENERATOR CONDUCTORS

GOVERNMENT INTEREST

The Government has rights in this invention pursuant to Contract No. DAAK-21-85-C-0214.

FIELD OF THE INVENTION

The present invention relates to an air core homopolar generator design (as opposed to "iron core") based on a series wound configuration which can provide viable sources of the electric power required for Electromagnetic (EM) launchers in the mobile tactical environment. The series wound air core configuration has proven favorable due to the tunable nature of the series wound air core firing circuit.

With such a generator, the load current is in series with the field windings, reference FIG. 1. That is the load current, which is the excitation current, varies as an exponential function of time and induces the generator magnetic flux. Due to the pulsed nature of the machine, this current varies with time. Consequently the generator magnetic field (4 Tesla range) varies with time. These high fields are required for proper voltage; but unfortunately eddy currents will also be induced by this changing field. The present invention provides a means of partial control of these eddy currents. A spiral coil geometry is used to develop the proper field magnitudes and profiles as well as provide for eddy current control.

DESCRIPTION OF THE PRESENT ART

Previous disclosures have discussed peripheral eddy current control; in other words eddy currents flowing circumferentially in the stator and rotor conductors. This disclosure, however, addresses global eddy currents. The present invention as hereinafter described completely addresses the global eddy currents in series wound air core homopolar generators.

The invention attempts to reduce the penalty imposed by the very nature of the series wound, self-excitation which creates a time varying magnetic field of large proportions. This time varying magnetic field causes eddy currents to flow in all conducting materials which are subject to it. Without the means, described herein, the magnetic field would be uncontrolled and would make the concept unworkable.

Anytime an electrically conducting material is subject to a time varying magnetic field, eddy currents will flow in that conductor in a direction to reduce the changing applied field, reference FIGS. 3A and 3B. These currents fall into two classes. The first class is called local eddy currents and the second class global eddy currents. Local eddy currents are those which flow in small loops. Examples of these are heating bolts and extra losses in conductors, etc., Their control is understood.

The second class, global eddy currents, are more of a problem. These are systems of eddy currents that have a high coupling with the excitation system and significant self-inductance. Thus, the excitation field is modeled as a closed resistive/inductive loop coupled to the main current system by mutual inductance. This is exactly as a shorted secondary on a transformer.

SUMMARY OF THE INVENTION

The purpose of this invention is to disclose means which can reduce the substantial eddy currents which are induced by the series wound air core homopolar generator. These currents are reduced with a segmented current collection system. The system is comprised of spiral coils with transposed conductors and a segmented rotor conductor with composite fiber reinforcement. The segmenting of the system prevents peripheral eddy currents from flowing. The use of transposed spiral conductors also reduces these eddy currents, reference FIG. 6. The invention allows independent current paths to be maintained. Closed conducting loops which trap substantial amounts of flux are avoided.

Small diameter coil conductors geometrically transposed produce opposing eddy voltages, eliminating or reducing eddy currents, FIG. 8. In this case an internally cooled design geometry is used. In as much as the structural strength of each coil spiral with transposed conductors is low, the spirals are nested in groups of eighteen and potted inplace; then the entire coil is wrapped with glass and kevlar composite, FIG. 7. Structural integrity is thus maintained by a high spiral packing and the outer composite layers.

It is therefore an object of the present invention to provide for the use of transposed rotor conductors, STET to reduce eddy currents to acceptable levels.

It is also an object of the present invention to provide transposed spiral coil windings to reduce eddy currents to manageable levels.

These and other objects of the invention will become apparent upon consideration of the detailed description of the preferred embodiment.

DETAILED DESCRIPTION OF THE PREFERRED EMBODIMENT

Figure 1:
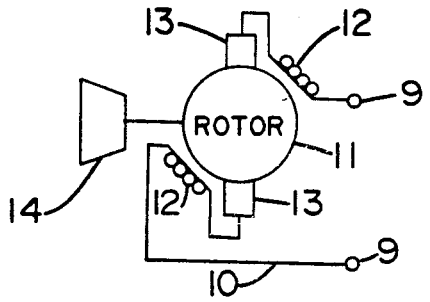
FIG. 1 shows a simplified circuit diagram for a series wound, air core generator.

FIG. 1 depicts the series wound air core generator 10 with its rotor 11, stator coils 12, and load brushes 13, shown being driven by a turbine 14. The voltage output is between the terminals 9.

Figure 2:
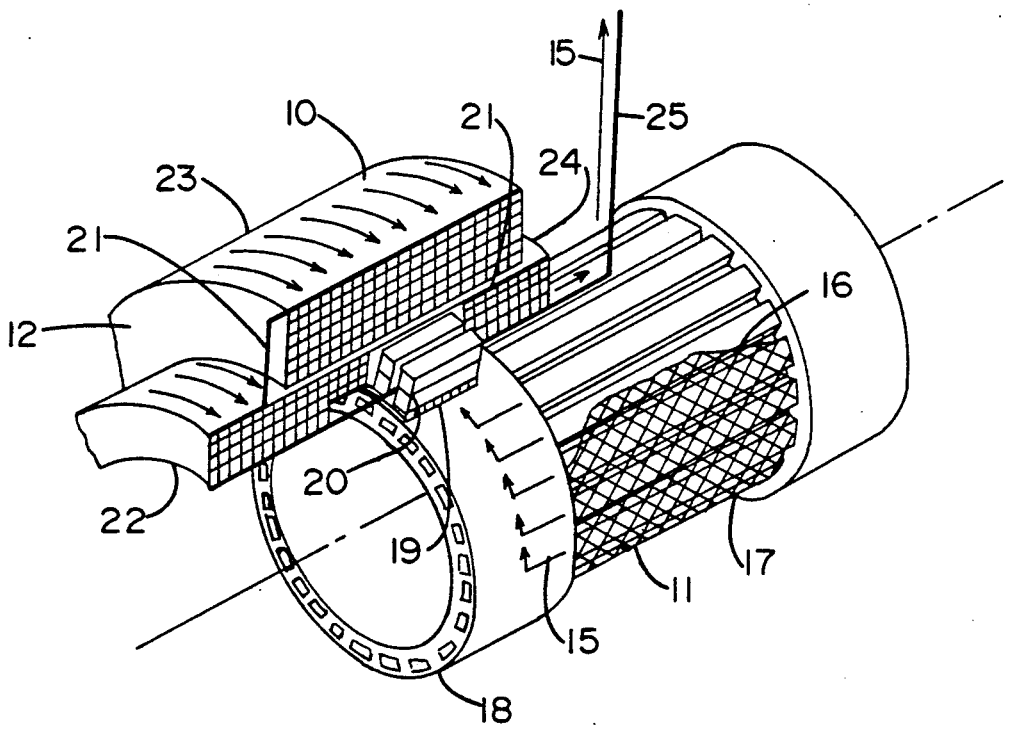
FIG. 2 shows a schematic of current flow path for one segment out of eighteen through the stator and rotor system of a series wound air core homopolar machine.

FIG. 2 depicts the rotor 11 with rotor conductors 17 of the series wound machine 10. FIG. 2 further depicts the stator 12 current system with its eighteen independent paths, one 15 of which is illustrated by the pointed arrows. This arrangement provides for the uniform distribution of current throughout the machine 10, a highly conductive path for the load current, a smooth transition between the rotor 11 and the stator 12, and only partial flux traps in the excitation winding.

Figure 3A:
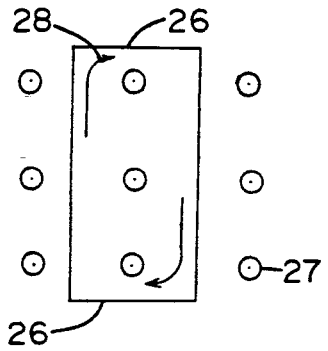
FIGS. 3A and 3B show a front view and a view at an angle respectively of radial eddy currents induced by a time dependent magnetic field current in a coil spiral cross section or rotor conductor bar section.
Figure 3B:
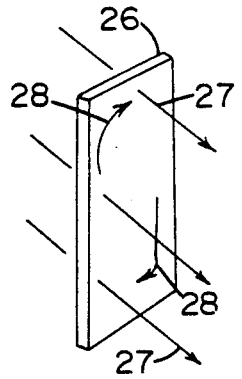

FIG. 3 depicts two views of a solid conductor analogy wherein a field coil spiral section 38 or rotor conductor bar 17 cross section 26 is shown in which the time dependent magnetic field radial components 27 coming out of the paper are shown to induce local eddy currents 28.

Figure 4:
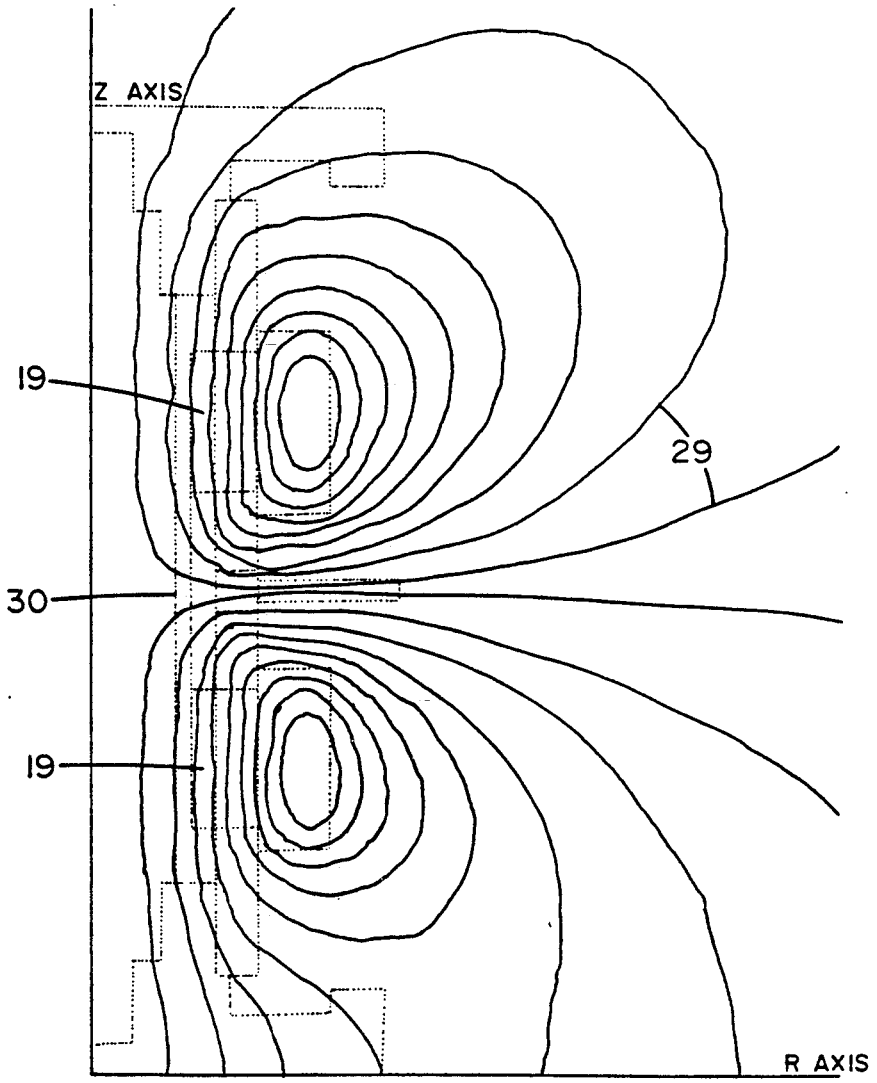
FIG. 4 shows the typical flux contours for a series wound air core homopolar generator.

FIG. 4 shows the flux contours 29 for the machine geometry of FIG. 2 with initial optimization of the coil excitation levels. In the flux plots shown, only one machine 10 is illustrated, but two machines 10 and their interaction have been considered by the inclusion of an appropriate boundary condition. In interpreting the flux plot of FIG. 4, the machine rotational axis of FIG. 2 is represented by the Z-axis and the line of symmetry between the two machines 10 by the R-axis. In FIG. 4 the term lower brush 19 is used to identify the brush set 19 closest to the R-axis. For this reason adjustments were made to the excitation levels in the coils of the stator 22, 23, 24 to create a symmetrical magnetic field in the active region 30 of the machine, between the bottom brush 19 and the top brush 19. In other words, each machine 10, with its rotor 11 although symmetrical with respect to its centerline, requires different current levels in the field coils of the top and bottom brushes 19 to achieve similar radial field profiles in the brush 19 area and machine active region 30.

By FIG. 4, it is clear that substantial radial flux exists in the windings of the rotor 11. Current in the coil spirals is essentially perpendicular to their radial flux. This geometry combined with a time varying current will produce eddy currents within each coil spiral and in the rotor conductors 17.

Figure 5:
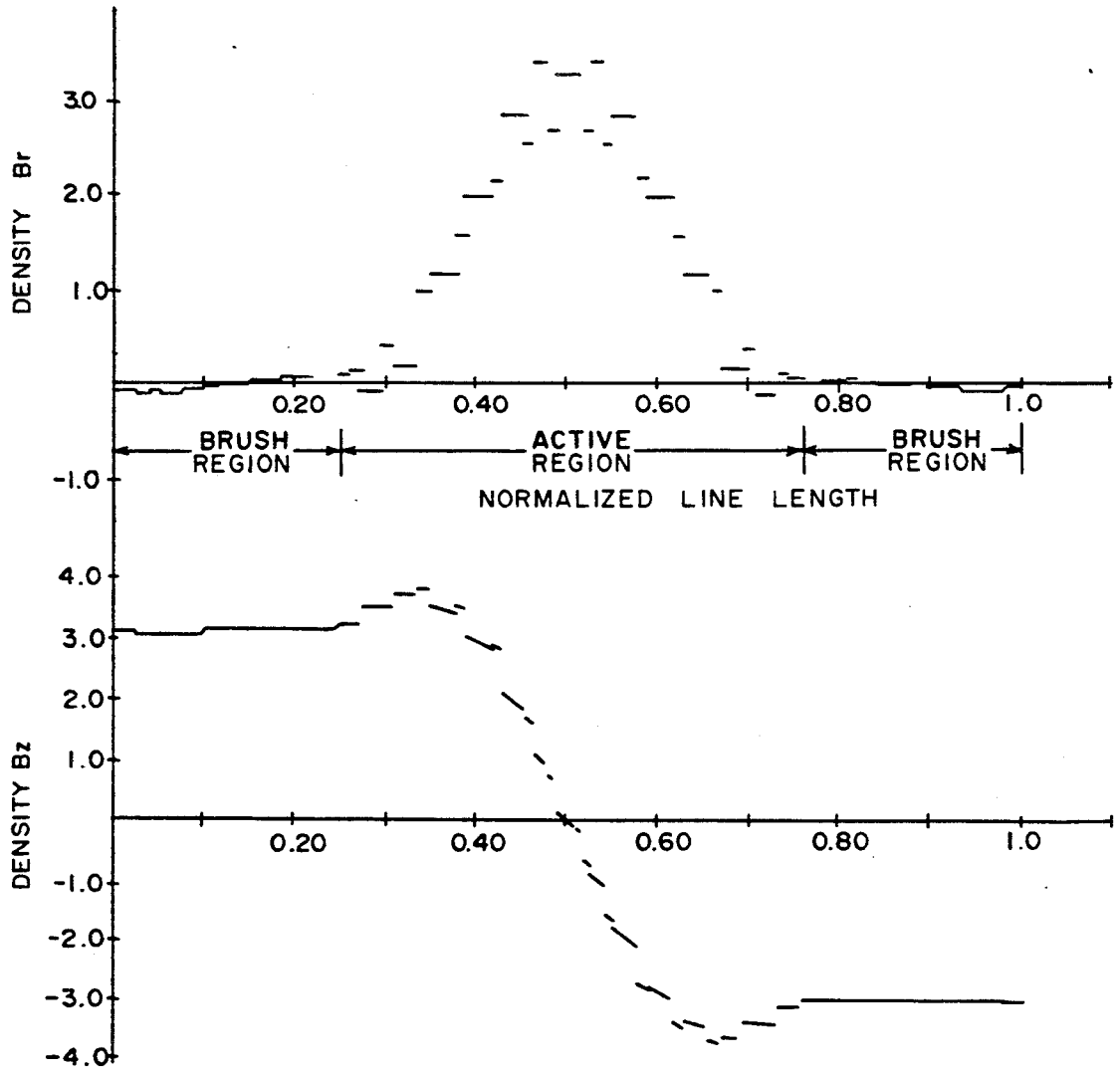
FIG. 5 shows the axial and radial components of magnetic flux density along a line extending from the top to bottom brush box current collectors at the rotor surface.

FIG. 5 shows the radial (Br) and axial(Bz) components of magnetic flux density along a line extending from the top to bottom brush box 20 at the rotor surface 11. The magnitudes correspond to the initial coil excitations used for the machine flux map at FIG. 4. The excitation levels were subsequently increased to yield a peak machine field of 4.5 Tesla in the active region 30. This higher field was required because of voltage needs of 320 volts per rotor 11. One can observe this large field in the active region 30 and in the brush box 20 at the surface of the rotor 11.

Figure 6:
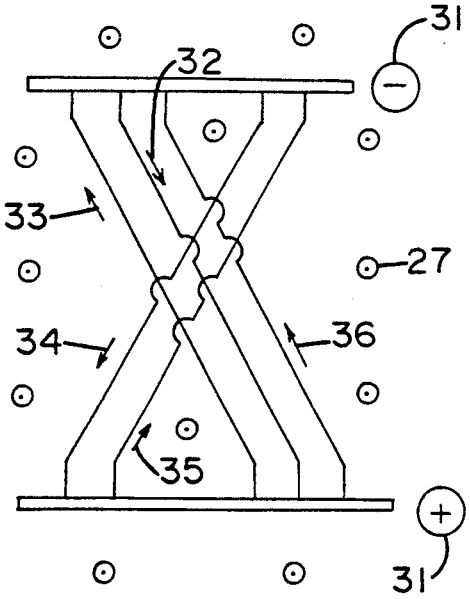
FIG. 6 is a schematic of transposed conductors and their related eddy current flow induced by a time dependent magnetic field.

FIG. 6. depicts the path of flow of eddy currents under a varying magnetic field which is possible by a transposed conductor design. Between the two terminals 31 a number of eddy currents 32, 33, 34, 35, 36 flow. Eddy current 33 cancels eddy current 36 for no net eddy current. This process is repeated between eddy currents 33 and 34. For this process to work, the number of transposed conducting strands must be kept odd.

Once again referring to the drawings, FIG. 2 depicts primarily the rotor 11 of a series wound air core machine 10 with the stator 12 with one of the 18 independent current paths which comprise the stator current system. Current 15 flows axially through the rotor bars 17 and into the slip ring 18. At the slip ring 18, the, current 15 flows axially and radially into a set of brushes 19. Once in the brush box 20, the current 15 flows axially through a jumper 21 to the inner radius of the outermost coil 22. The current 15 then spirals outward to another jumper 21 where it is taken to the outer radius of the center coil 23. The current 15 spirals radially inward to the outer radius of the most inboard coil, through a jumper 21, and into the last coil in the subgroup 24. From the inner radius of this coil 24, the current 15 flows to a jumper 21 and then to one of the main lead segments where the current 15 flows out of the machine 10. Only half the current flow has been illustrated. Current enters the machine in a symmetric pattern to that just described. The stator coil arrangement is made by indexing this flow pattern eighteen times about the periphery of the machine. These eighteen independent paths are joined electrically outside the machine prior to feeding the load.

Figure 7:
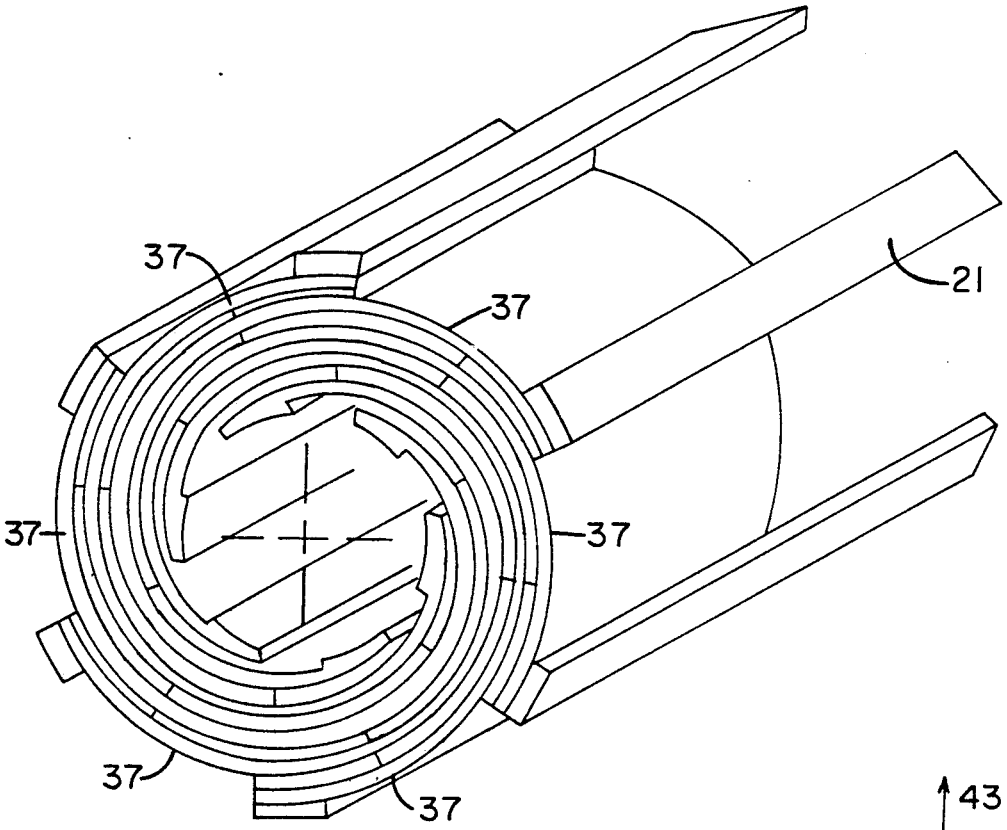
FIG. 7 shows a series wound air core spiral coil configuration with multiple transposed spiral conductors.

FIG. 7 shows the stator coil arrangement when nested together, except that there are eighteen independent paths 37 rather than the six illustrated. The spiral arrangement ensures that each parallel path 37 is identical to each other and provides for uniform distribution of current throughout the electrical system.

Each coil of the individual conductors 37 lies on an Archimedian spiral and traverses an arc equal to the fraction of turn required to generate machine magnetic flux. For the eighteen spiral segments 37 proposed for the machine 10, the field varies from plus to minus four percent about a mean value with the mean value being within 0.3 percent of that calculated for a circular current sheet. The spiral winding 37 is equivalent to a circular current sheet from the standpoint of excitation requirements.

In this design both the magnetomotive force and the current are dictated by generator design constraints; consequently the number of turns is specified completely for each coil 37. This means less than one turn per coil 37. The usual multi-turn design approach would lead to a seriously distorted solenoidal field if only a fraction of a turn were used to make the coil 37. Ampere-turn per coil ranges were between 405,000 and 1,500,000 while the revised design maximum is 2,250,000 ampere turns. To overcome this difficulty, each of the eighteen brush boxes 20 was connected separately to each spiral coil partial turn. Each spiral 37 was then azimuthally indexed by one-eighteenth of a circle. This approach permits a reasonable averaging of the fields produced by individual overlapping partial turns and results in an acceptable field uniformity, and achieves the fractional turn required to meet the electromagnetic design constraints.

Figure 9:
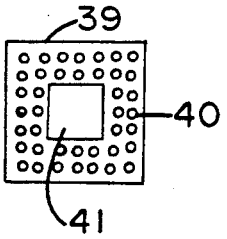
FIG. 9 shows a cross section of the spiral conductor.
Figure 8:
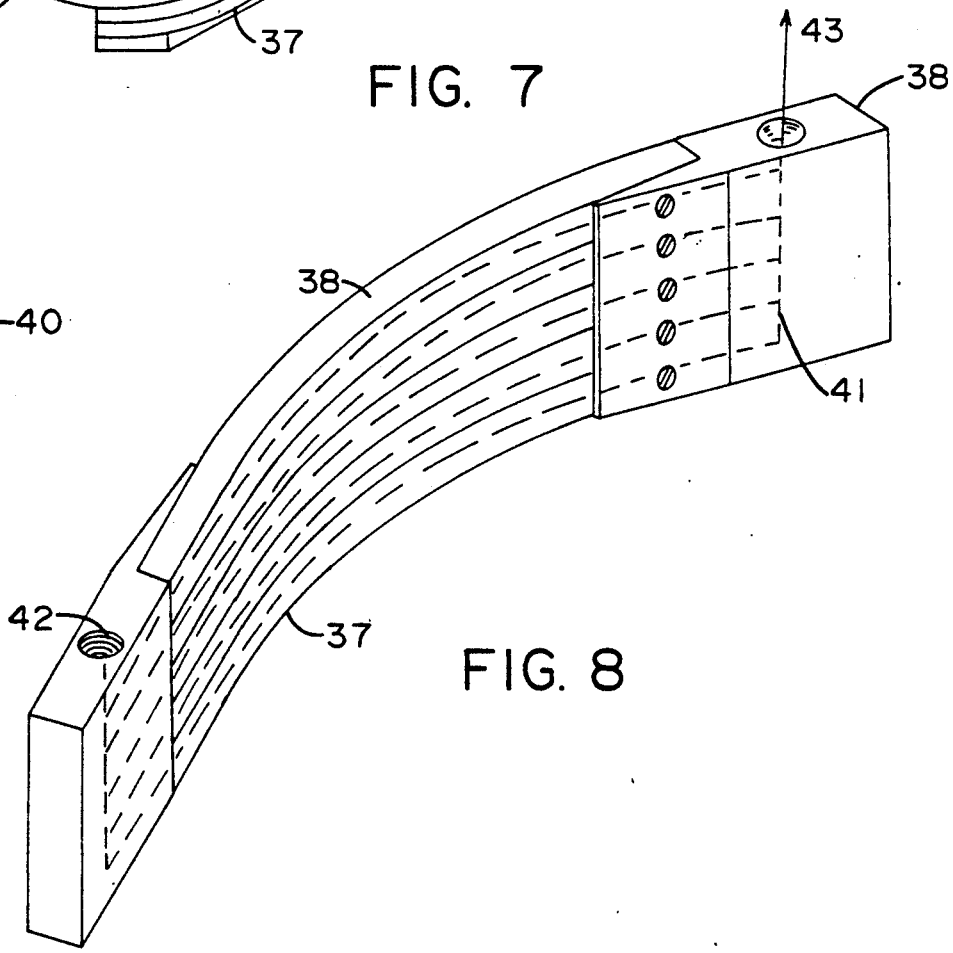
FIG. 8 is a schematic showing coil spiral.

FIG. 8 depicts the details for one spiral section 37. The wrapping of the eighteen such spiral sections 37 with their transposed conductors 40 with glass and kevlar composite 16 is shown at FIG. 2 in order to provide the requisite strength. In FIG. 8 the construction option selected comprises plates 38 made up of many parallel square transposed aluminum conductors 40. FIG. 9 depicts a cross section 39 of the transposed aluminum conductors 40. These conductors 40 are cooled where necessary by circulating water through an internal coolant passage 41 in each conductor as shown in FIGS. 8,9. The coolant entry 42 and exit 43 are shown at FIG. 8. While the present invention has been shown in but one major variation and a number of various means, it is obvious to those skilled in that it is not so limited, but is susceptible to various changes and modifications to be embodied in other specific forms without departing from the scope and spirit or essential attributes thereof.

Accordingly, it is intended that the present invention embrace all alternatives, modifications variations as fall within the spirit and broad scope of the appended claims.

What is claimed is:

1. A rotor/stator apparatus for a series wound air core homopolar generator with high magnetic fields which controls and reduces eddy currents comprising:

means for segmented stator current collection to prevent eddy currents from flowing;

means for segmented rotor conductors to prevent eddy currents from flowing.

2. A rotor/stator apparatus as set forth in claim 1 wherein said means for segmented stator current collection includes:

multiple independent current paths;

means for joining the multiple independent paths outside the apparatus to feed the desired load.

3. A rotor/stator apparatus as set forth in claim 1 wherein said means for segmented stator conductors includes:

an Archimedian coil arrangement of multiple spirals to reduce eddy currents which traverse an arc equal to a fraction of a required turn, which arrangement insures that each spiral comprises a respective parallel path each identical to one another and provides for uniform distribution of current to the stator;

means for wrapping of said stator conductors to provide added physical strength for the coil arrangement.

4. A rotor/stator apparatus as set forth in claim 3 wherein said coil arrangement further comprises:

plates which contain parallel transposed conductors to reduce eddy current; and means for providing internal passages for water cooling.

5. A rotor/stator apparatus as set forth in claim 4 wherein the said transposed conductors in the plates are aluminum with square cross sections.

6. A rotor/stator apparatus as set forth in claim 3 wherein the said means for wrapping the said stator conductors to provide added physical strength comprises a composite material of glass and Kevlar®.

7. A series wound air core homopolar generator system comprising a segmented stator current collection system which is fed by current from multiple parallel rotor conductors to prevent eddy currents from flowing and comprised of spiral transposed aluminum conductors to reduce eddy currents.

* * * * *